United States Patent Office 3,538,268
Patented Nov. 3, 1970

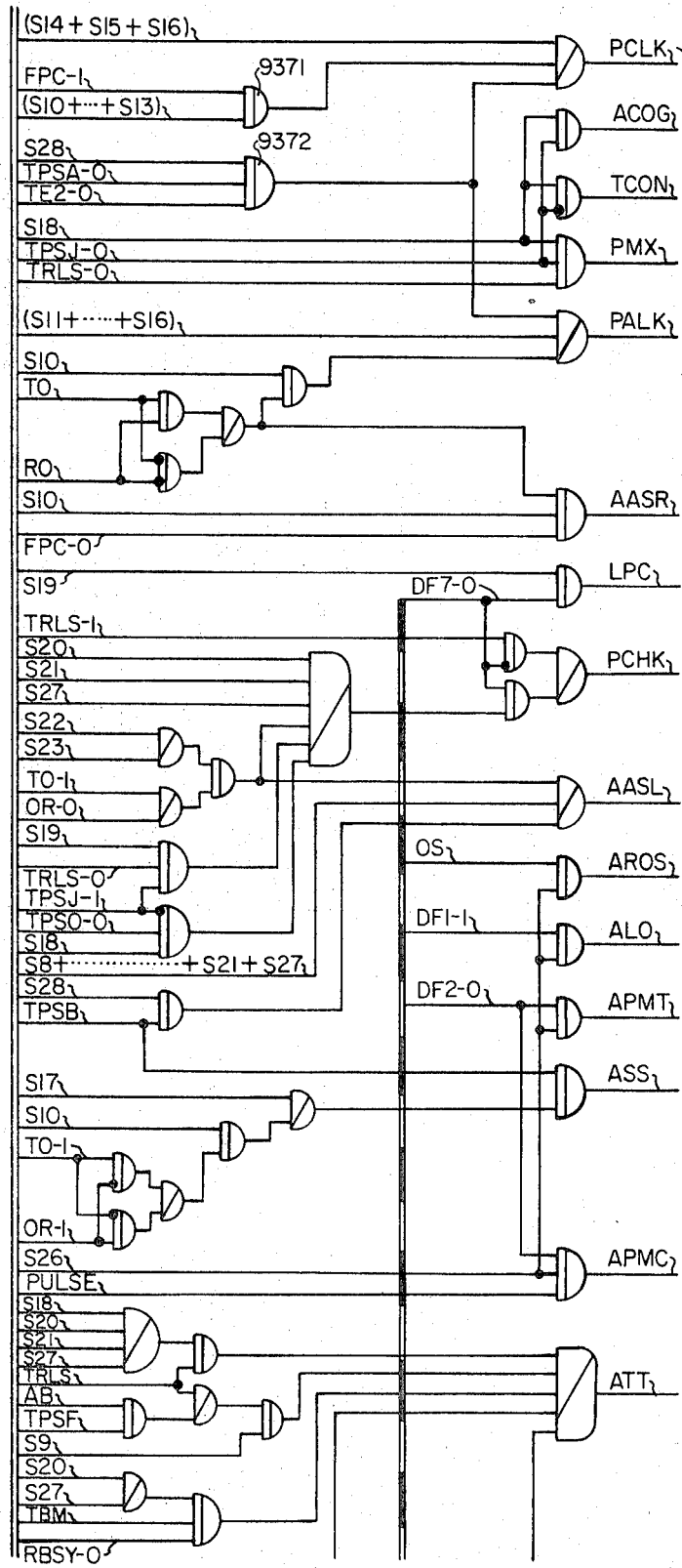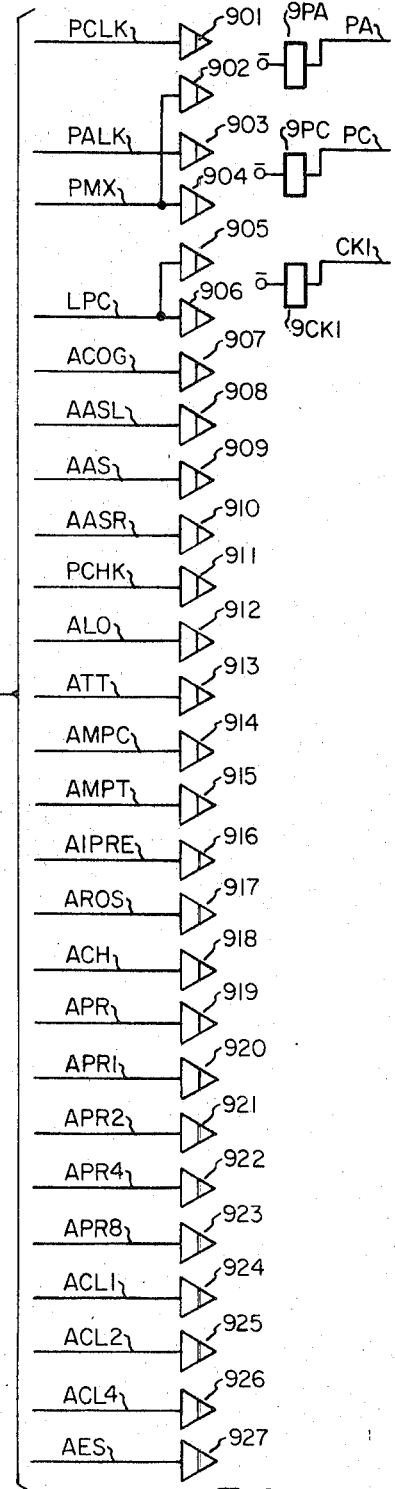
FIG. 9

3,538,268
CONTINUITY FAULT DETECTION
Alfred S. Cochran, Elmhurst, Ill., assignor to Automatic Electric Laboratories, Inc., Northlake, Ill., a corporation of Delaware
Filed May 9, 1968, Ser. No. 728,006
Int. Cl. H04m 3/24
U.S. Cl. 179—175.25                    6 Claims

ABSTRACT OF THE DISCLOSURE

Apparatus for checking the continuity of selected ones of a plurality of leads in a common bus extending from a marker to terminating circuits, such as line, trunk and junctor circuits in a communication switching system. This bus from the marker is connected to a particular terminating circuit during the extension of a call therethrough. In this process the terminating circuit is connected, via relay contacts, to only selected ones of the common bus leads. Some of these leads are used in every connection to the terminating circuit, while others are used only on occasion. Prior to processing, the leads are tested for proper connections to the terminating circuit. The checking circuit consists of a coincidence gate having input connections directly to the common bus leads which have connections to every circuit termination, and input connections via detector gates to the common bus leads which do not have connections to every circuit termination. Each detector gate is also provided with other input connections from the marker, and is normally enabled by one of these inputs. To check for lead continuity, detector gates associated with leads which are to be used are inhibited, but are enabled by the continuity signal on the respetcive common bus lead. The coincidence gate, in response to the detector gate outputs and the common bus lead conditions, generates a signal indicative of continuity or lack of continuity.

CROSS-REFERENCES TO RELATED APPLICATIONS

The preferred embodiment disclosed herein is part of the system described in U.S. Pat. 3,328,534 by R. J. Murphy et al. for a Communication Switching System, and in U.S. Pat. application Ser. No. 463,587 filed June 14, 1965, now Pat. No. 3,413,421 for Apparatus to Select and Identify One of a Possible Plurality of Terminals Calling for Service In a Communication Switching System, by A. S. Cochran and F. B. Sikorski. Other applications describing apparatus of the system related to the preferred embodiment include Ser. No. 517,226 filed Dec. 29, 1965, now Pat. No. 3,452,159 for Call-For-Service Circuits of a Communication Switching Marker, by J. R. Vande Wege; and Ser. No. 670,032 filed Sept. 25, 1967, now Pat. No. 3,524,934, for Priority Calling for Communication System Trunk Circuit, by L. L. Smith and W. C. Miller.

BACKGROUND OF THE INVENTION

This invention relates to maintenance provisions for a communication switching system and more particularly to fault detection and localization provisions for a system having a plurality of various types of end equipments which are controlled by a common plurality of control leads.

In a communication switching system, it is frequently required that a number of termination units, such as trunk circuits, line equipment circuits, junctor circuits and the like, be supervised and controlled by a common unit, such as a marker, via a common plurality of control leads, hereafter referred to as a "common bus." These termination units may and do vary, depending on their functions and the type of service they are designed to provide in the system. Each of the termination units has a connecting device, such as a relay, for connecting its equipment to the common bus leads. Some of this equipment is associated with functions common to all units. Further, some functions and the associated control devices are required in certain units and not in others. Therefore, different types of termination units employ different subsets of the totality of common bus leads. Also, some of the termination units are equipped with controlling devices capable of performing many functions; however, for a particular call only a particular function or set of functions of that termination unit may be utilized. The marker is usually equipped to serve these termination units via a common bus on a one-at-a-time basis.

To provide good reliability of the system, the particular common bus leads connected to one of the termination units for an operation should be tested for continuity. The simplest way to do this would be to test all of the bus leads. However, since at least some of the unused leads will normally be open, a continuity check of them would give a false indication of failure.

The marker could be provided with information as to the type of equipment in the termination unit to which it connects, and be equipped to use this information to detect failures to connect or disconnect from the common bus; but this would require a large quantity of special apparatus in the system.

One possible malfunction can occur by failure of contacts of the connect relay. Another malfunction may occur due to a faulty relay in the termination unit. Thus, it is necessary to provide means for checking the conductors of the termination unit that are supposed to be connected to the bus leads, or conductors that are going to be used for that particular call if the termination unit has more connections to the bus leads, and detect any failure in connecting the control devices to these leads.

SUMMARY OF THE INVENTION

Accordingly, this invention provides a checking circuit to distinguish which of the common bus leads are connected to the termination unit, to thereby check the termination equipment connected to these particular leads. The checking circuit is further provided with means to check only the termination equipment that is required for the call being processed.

This is accomplished by having each common bus lead connected to the input of an individual detector gate, where each detector gate also has at least one other input connection from a special instruction register, and the outputs of all of the detecting gates are connected to an AND function gate which has a single output. Upon connection of the termination unit to the common bus leads, a negative potential is extended from the termination unit via controlling devices and the connect contacts of that particular unit to the respective bus leads.

The leads that are not connected to this particular unit, and the leads that are connected but will not be required to extend signals for this call, are provided with a potential representative of the potential from the termination unit by the special instruction register. Therefore, every detector gate should have a signal on its input, either from the termination unit or from the special instruction register. The AND function gate to which all of the detector gate outputs are connected should under these conditions have an output signal indicating "no error"; however, should one of the detector gates not have a negative potential on any of its inputs, the AND function gate output will be such as to indicate an "error." Therefore, the absence of the negative potential at the inputs of the gates not enabled by the special instruction register is indicative of a faulty condition, the outputs of the detector gates are used to localize the error to the particular lead or leads, whereupon the marker temporarily stops the process of establishing a connection for that particular call, and supplies the trouble recording facility with the number of the termination unit and the associated equipment.

BRIEF DESCRIPTION OF THE DRAWINGS

The operation of the checking circuit according to the present invention will be better understood with reference to the following detailed description and the accompanying drawings in which:

FIGS. 3–11 comprise a diagram of the portion of the system associated with the switch marker, the terminations of the switch matrix, and the common bus connections between the switch marker and the plurality of terminals; FIGS. 3–11 are to be arranged.

Figure 1:
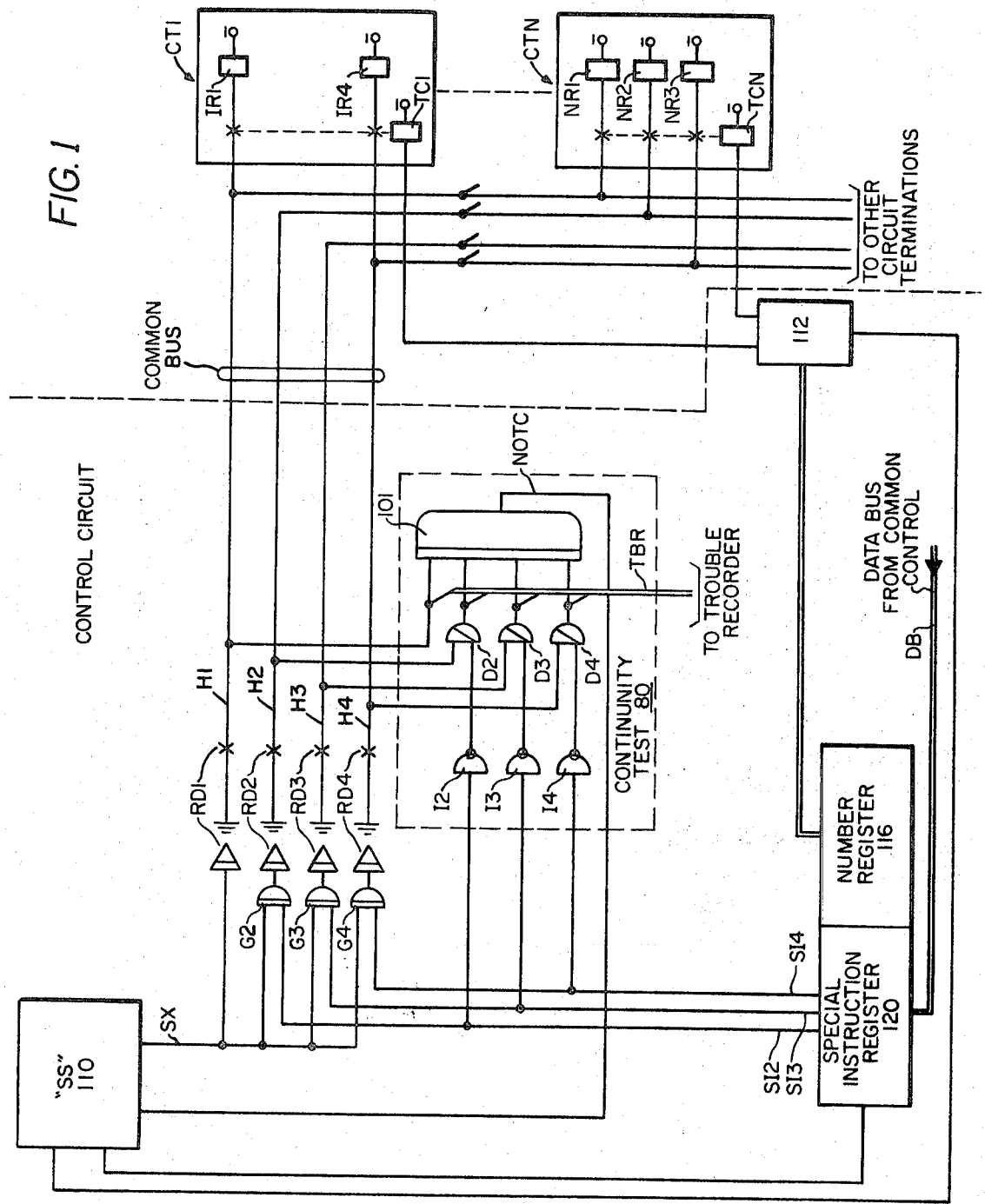
FIG. 1 is a schematic and functional block diagram of an embodiment showing the invention in a simplified form.

In describing the apparatus in the system various conventions have been used. For example, a minus sign adjacent a small circle representing a terminal indicates minus 50-volt connection from the exchange battery. In several figures of the drawings, the relay contacts are shown detached from the relay winding. Contacts which are closed when the associated relay is deenergized, known as "break contacts" are represented as a single short line perpendicular to the conductor line, while contacts which are closed when the relay is energized, known as "make contacts," are represented by two short cross lines diagonally intersecting the conductive line. Each set of relay contacts is identified by the relay core designation together with an individual contact number.

The electronic logic circuit used in this system is direct-coupled (D.C.), that is, signals are represented by steady state voltages. Two levels are employed. The first level is a negative potential, and represents the binary one, true, on, or active condition. The second level is ground potential and represents the binary zero, false, off, or inactive condition. These logic circuits along with flip-flops for counting and register purposes are used in the various circuits and scanners disclosed herein in block diagram form.

The logic circuits use NOR gates, each of which is a one transistor logic element whose output is true if all of the inputs are false and whose output is false if any one of the inputs is true. The inputs are coupled to individual resistors to the base electrode, and the output is taken from the collector electrode. For convenience in the drawings, most of the logic gate circuits have been represented by AND gates and OR gates. In actual implementation an AND gate is achieved by using a NOR gate with each of the inputs inverted, and an OR gate is obtained by using a NOR gate followed by an inverter amplifier. It may be readily seen that in situations in which AND functions and OR functions appear alternately in tandem that NOR gates may be used with no inverters between them. An inverter amplifier is a circuit similar to a NOR gate, except that it has only a single input.

A relay driver is a circuit represented by a triangle having a line across it parallel to the base, with a single input to the base, and a contact adjacent to the apex. Each relay driver comprises a single transistor with the input connection to its base electrode, and a winding in the collector circuit which operates the single contact.

DESCRIPTION OF SIMPLIFIED EMBODIMENT

FIG. 1 shows a portion of a system to illustrate the basic principle of the invention in simplified form. There are a plurality of circuit terminations, of which CT1 and CTN are shown, which respectively include connect relays TC1 and TCN. Each of the circuit terminations includes a number of control devices shown as relays 1R1 and 1R4 in circuit termination CT1, and as relays NR1, NR2, and NR3 in circuit termination CTN. Each of the circuit terminations includes additional apparatus, including contacts of the control relays, which is not shown. A common bus 10A comprises a number of conductors, each of which is connected in common to a number of the termination circuits, and some of which are common to all of them. The drawing shows conductor H1 of the bus connected to all of the termination circuits, conductors H2 and H3 connected to a number of circuits including CTN, and conductor H4 connected to a number of circuits including CT1. Each of the control relays of each termination circuit has one side of its winding connected to negative battery potential, and the other side connected through contacts of the connect relay to one of the common bus conductors, with the drawing showing relays 1R1 and NR1 connected to conductor H1, relays NR2 and NR3 connected to conductors H2 and H3, respectively, and relay 1R4 connected to conductor H4. The remaining apparatus in FIG. 1 is part of a common marker which includes sequence and supervisory circuits 110, a register including a special instruction register 120, a number register 116 for receiving information via the data bus DB from common control apparatus (not shown), and a set of gates G2–G4 with associated relay drivers RD1–RD4 for supplying ground potential to the common bus conductors. A continuity test circuit 80 includes detector OR gates D2–D4 each of which has an input from one of the common bus conductors and another input via respective inverters I2–I4 from output leads of the special instruction register, and a coincidence AND gate 101 supplying an output signal NOTC to the sequence and supervisory circuits 110 to indicate that the bus tests satisfactory.

An access circuit 112 receives a number from the number register 116 and supplies a signal to operate the connect relay of the corresponding circuit termination.

In operation the sequence and supervisory circuits 110 first enable the registers 116 and 120 to receive information via the data bus DB from the common control equipment, and in a subsequent sequence state enables the access circuit 112 to operate the connect relay of the terminating circuit corresponding to the number stored in register 116. This connects the control relays in the selected circuit termination to the corresponding common bus conductors. If the connect relay operates properly and the conductor paths are otherwise intact, the negative potential applied through the control relay windings should appear on the common bus conductors in the marker. If the conductor path were not intact it would be impossible for the marker to supply ground potential to operate the control relays properly. Therefore the apparatus 80 is used to make a continuity test. For the leads which are used negative potential appears at the inputs of the corresponding detector OR gate and thence to the input of the coincidence AND gate 101. Leads such as H1 which are used for all operations are connected directly to an input of the gate 101. Note that conductors which are not connected to the selected circuit termination do not have negative potential applied thereto. Therefore an attempt to make a continuity check on these leads would result in a false failure indication on conductor NOTC. However for the unused conductors the system is organized so that there will always be a "false" signal condition on the corresponding output of the special instruction register 120. According to the invention this "false" signal condition is inverted in the corresponding one of the inverters 2–4 and applied to another input of the detector OR gates to enable the coincidence AND gate 101. Thus for every one of the inputs of gate 101, there should be negative potential either from the common bus conductor or from the inverted output of the special instruction register 120.

Assume first an operation involving circuit termination CT1. Upon a sequence state command from the sequence and supervisory circuits 110, information is received from the common control via the data bus DB loading the number of circuit T1 into the number register 116, and loading special instructions into register 120, which for example may comprise the binary digits "0 0 1." The next command from the sequence and supervisory circuit 110 causes operation of the access circuit 112 to read the number from register 116, and in response thereto to supply a ground potential to operate relay TC1. Relays 1R1 and 1R4 are now connected via the contacts of relay TC1 to the common bus conductors H1 and H4 respectively. For making a continuity test in circuit 80, the negative potential through the winding of relay 1R1 and the contacts of relay TC1 extends to the upper input of gate 101, and the negative potential through the winding of relay 1R4 likewise extends via contacts of relay TC1 and conductor H4 to an input of detector gate D4, which produces a "true" signal at the last input of gate 101. Since there are no relays connected to bus conductors H2 and H3, the signals on the upper inputs of detector gate D2 and D3 are "false." However the first two binary zeros in special instruction register 120 supply "false" signals to leads SI2 and SI3 which via inverters I2 and I3 respectively supply "true" signals to the lower inputs of gates D2 and D3, thereby applying "true" signals to the second and third inputs of gate 101. Therefore with all of the inputs of gate 101 "true" the signal NOTC becomes "true," so that the sequence and supervisory circuit 110, in making a check for continuity is able to advance to the operate sequence state, during which a "true" signal is applied to lead SX. This signal operates relay driver RD1, and supplies a "true" signal to the upper input of each of the gates G2, G3 and G4. However the signals on the leads SI2 and SI3 being false, gates G2 and G3 do not enable their respective relay drivers RD2 and RD3. The true signal on lead SI4 enables gate G4 to operate the relay driver RD4. Thus ground signals are supplied via the relay-driver contacts to leads H1 and H4, to operate the control relays 1R1 and 1R4. After the circuit termination CT1 completes certain operations in response to operation of the control relays, the sequence and supervisory circuit 110 causes the access circuit 112 to remove the ground potential from relay TC1 to restore it, and thereby disconnect the circuit termination T1 from the common bus 10A.

Assume next an operation involving the circuit termination CTN. Again information is received, during the first sequence state, via data bus DB to load the number of circuit TN in register 116 and special instructions in register 120, which instructions may for example be the binary digits "1 0 0." In the next sequence state the access circuit 112 supplies ground potential to operate relay TCN, thereby connecting relays NR1, NR2 and NR3 to the common bus conductors H1, H2 and H3 respectively. The negative potential through the windings of the control relays and the contacts of the connect relay apply "true" input signals directly to the upper input of gate 101, and via detector gates D2 and D3 to the second and third inputs. A "false" signal on lead SI4 via inverter I4 supplies a "true" signal through gate D4 to the lower input of gate 101. The "false" signal on lead SI3 also supplies a signal through inverter I3 to the lower input of gate D3, which, however is redundant in this case because there is also a "true" signal at the upper input of gate D3. The "false" signal on lead SI3 is interpreted as indicating that the control relay NR3 will not be used for this operation even though it is connected to its common bus lead H3.

When the sequence and supervisory circuit 110 tests for continuity, it finds a "true" signal on lead NOTC and therefore advances to the operate sequence state to supply a "true" signal to lead SX. Gate G2 has a true signal at its lower input from the special instruction register while gates G3 and G4 have false signals. Therefore only relay drivers RD1 and RD2 operate, thereby supplying ground potentials over conductors H1 and H2 to operate relays NR1 and NR2, respectively. After the completion of the operations in circuit termination TN, the sequence and supervisory circuit causes access circuit 112 to remove the ground potential to release relay TCN, and thereby disconnect the control relays from the common bus again.

If during the continuity test for any operation involving a termination circuit there is no negative potential on a common bus conductor which is to be used during that operation, then the signal NOTC from gate 101 will be false, which will cause the sequence circuits to abort the cycle of operations and cause the signals at the inputs of gate 101 to be supplied via a cable TBR to a trouble recorder. This will record the identity of the conductor which failed. Note that by aborting the operation at this time the common marker is not held up attempting to perform operations which cannot succeed. Thus the marker is released for use in other operations by other circuit terminations.

Note that with the feature in the continuity test circuit 80 of supplying inputs from the special-instruction-register output leads via inverters to extra inputs of the detector gates, that it is unnecessary to supply information to the marker relating to the type of circuit termination that will be used in the particular operation, since all of the leads needed for the operation will be tested.

DESCRIPTION OF PREFERRED EMBODIMENT IN A COMMUNICATION SWITCHING SYSTEM

The preferred embodiment of the invention is incorporated in the marker of a communication switching system, to check the continuity of the leads of a common bus extending from the marker to line, trunk, and junctor circuits, which are used as terminations of the switching network.

Figure 2:
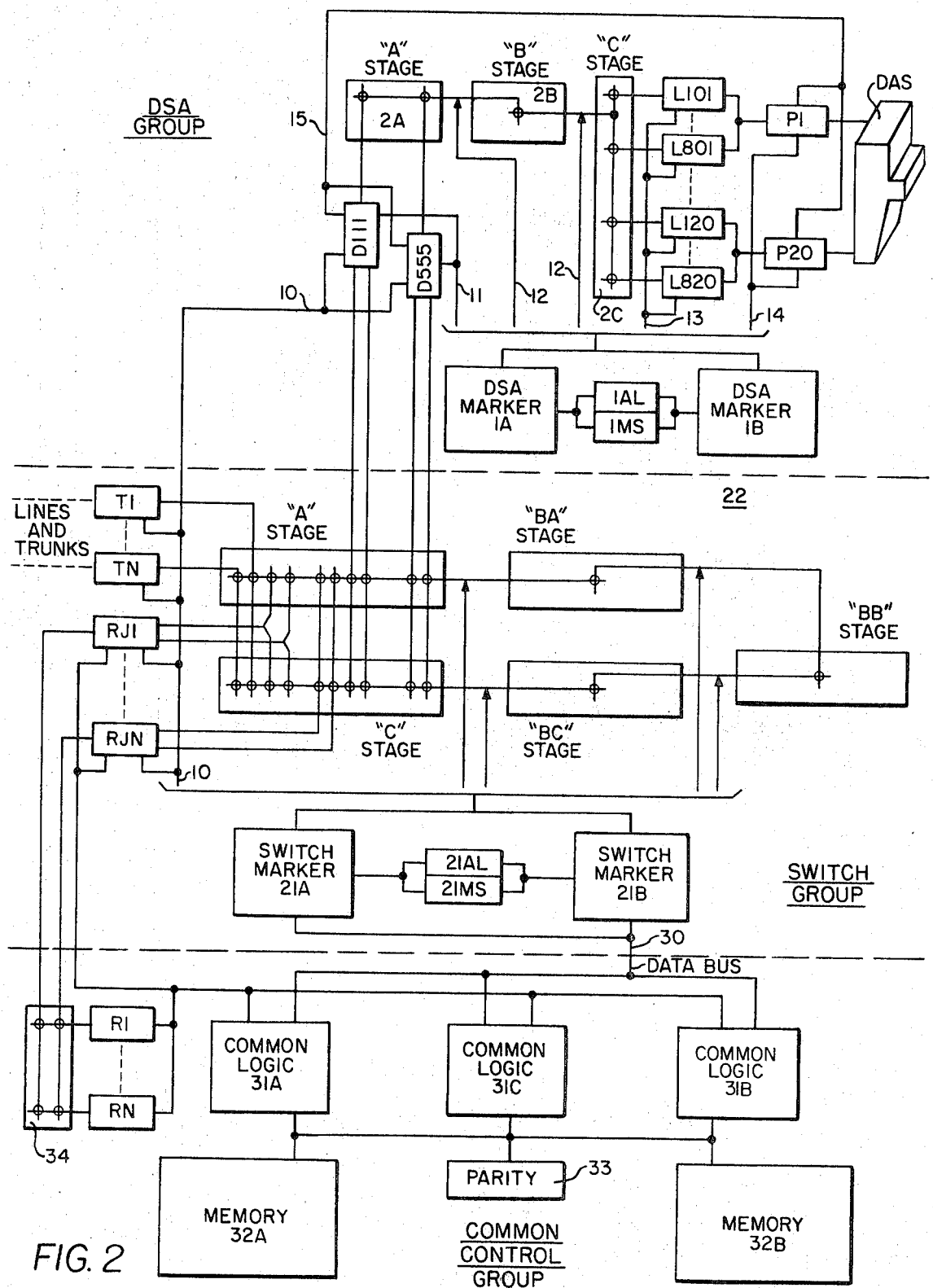
FIG. 2 is a block diagram of a communication switching system in which the invention may be incorporated.
Figure 3:
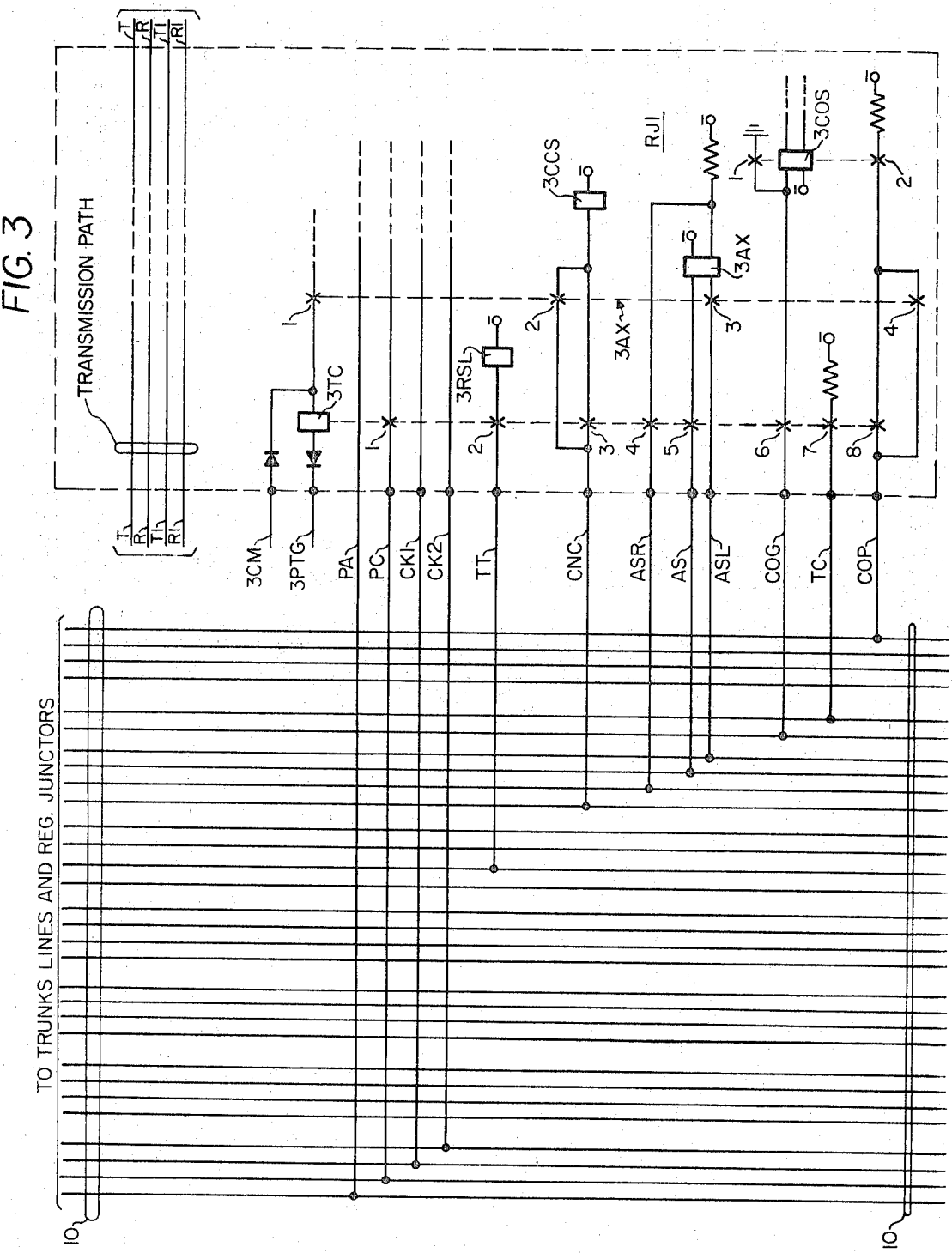
Figure 4:
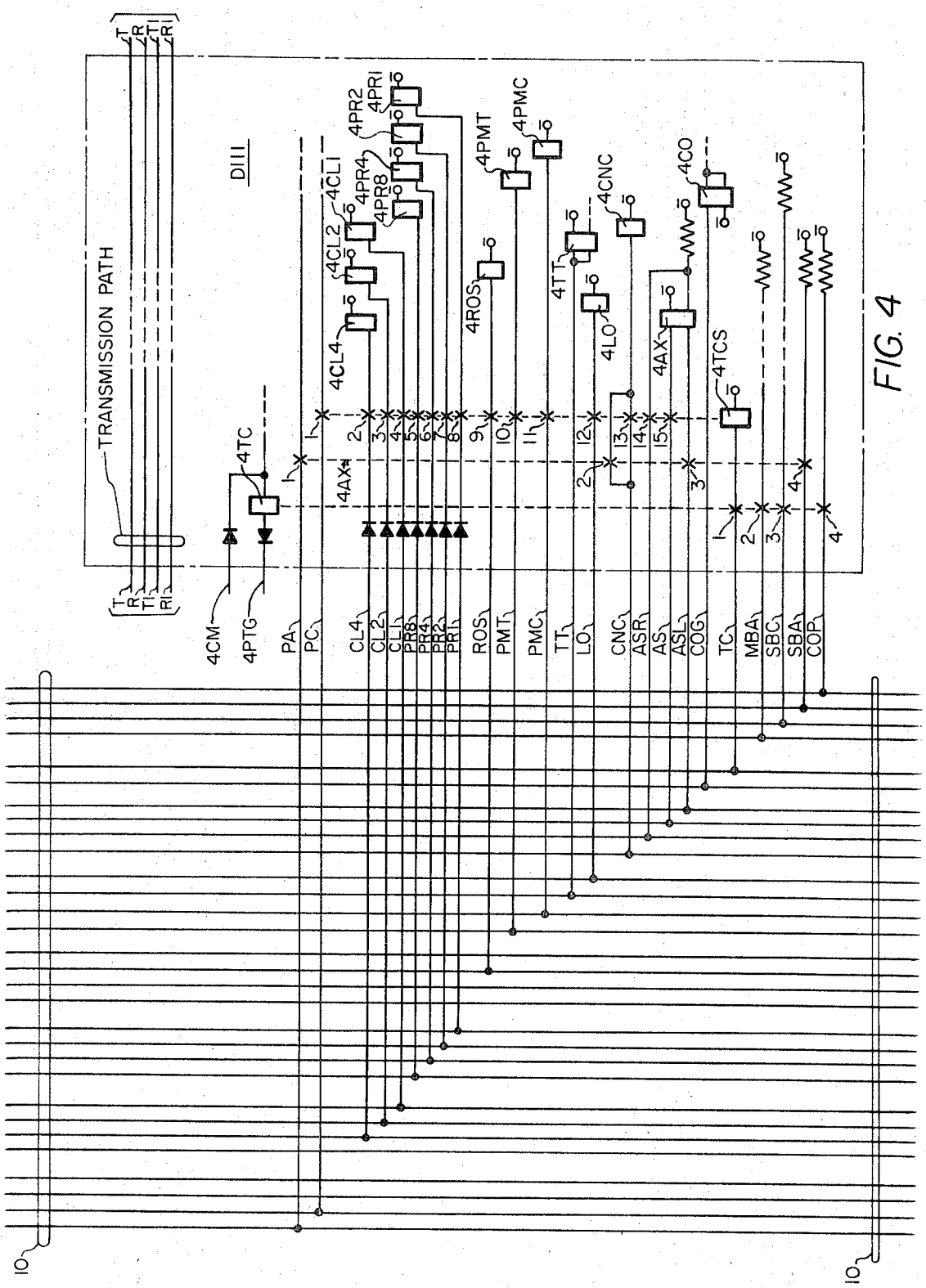
Figure 5:
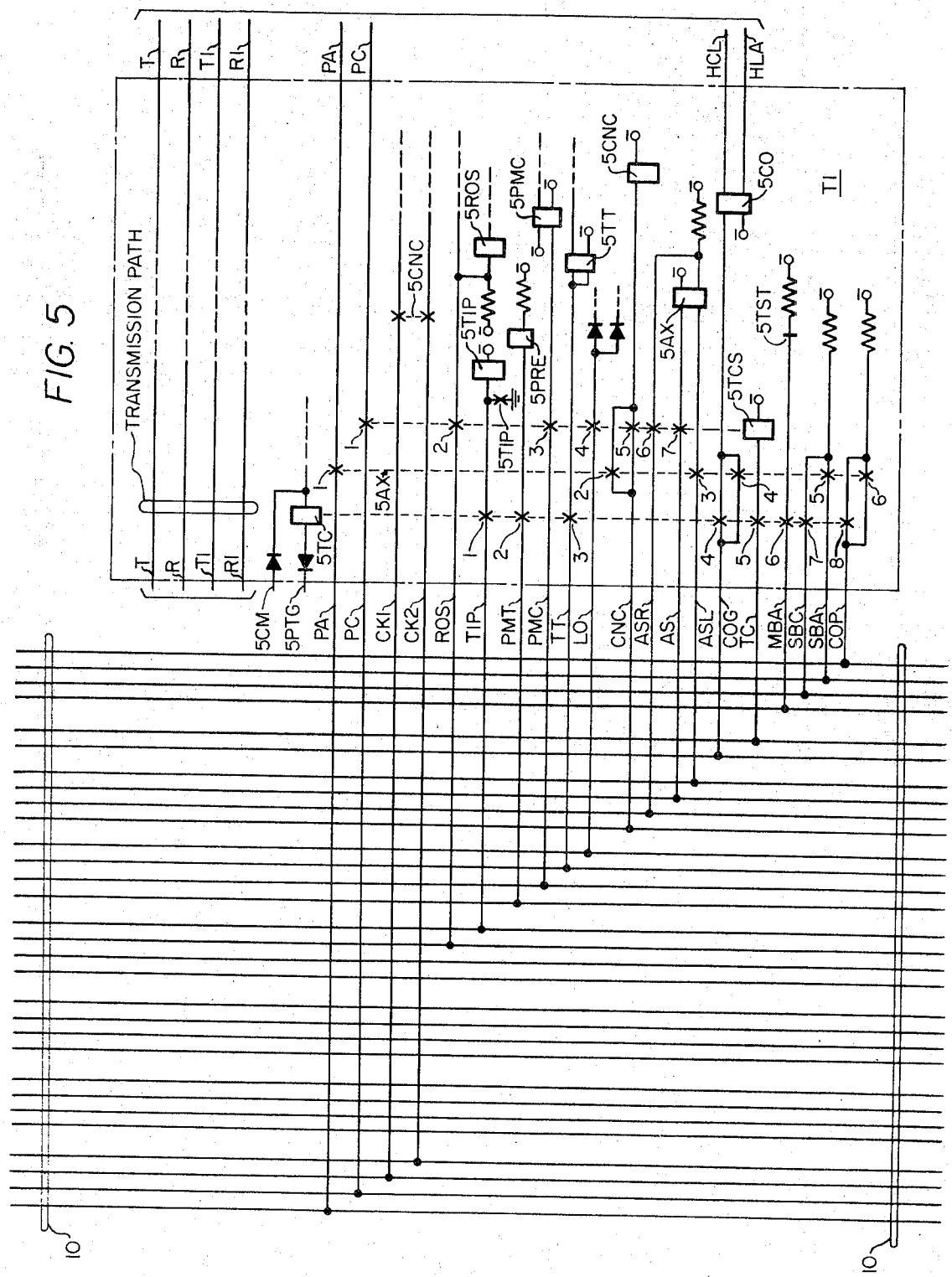

For comparison of the simplified embodiment of FIG. 1 with the preferred embodiment of FIGS. 2–11, note that the termination circuits CT1–CTN of FIG. 1 correspond generally to the termination circuits T1–TN, RJ1–RJN, and D111–D555 of FIG. 2, representative ones of which are shown in FIGS. 3–5; bus 10A corresponds to bus 10; and the remaining circuits of FIG. 1 correspond to circuits of a switch marker 21A or 21B, parts of which are shown in detail in FIGS. 6–11. In particular continuity test circuit 80 of FIG. 1 corresponds to that shown in FIG. 8 with gate 101 analogous to gate 801, and gates D2–D4 analogous to gates 802–816; relay drivers RDI–RD4 correspond to relay drivers 901–927; gates G2–G4 correspond to gates shown in FIGS. 9 and 10; circuit 12 corresponds to 1112; instruction register 120 corresponds to register 1120; and number register 116 corresponds to registers 1116 and 1118 combined.

General description of the system

The switching system is described in said Murphy et al. patent and related applications. FIG. 2 is a block diagram of the principal portions of the complete exchange. The typical exchange comprises three different groups. The DSA (dial service assistance) group is shown at the top of the figure, the switch group is shown at the center of the figure and a common control group is shown at the bottom of the figure. The switch group comprises a five stage network 22 for connecting together any two of a plurality of terminals. These terminals include a plurality of line and trunk circuits T1–TN of various types, a plurality of register junctor circuits RJ1–RJN and the dial service assistance trunks D111–D555. Each of the terminal circuits T1–TN has one network terminal connection having two appearances, one at the A stage and one at the C stage. Each of the register junctor circuits has two network terminals one for receiving and one for sending, each likewise having both an A appearance and a C appearance. Each of the DSA trunks D111–D555 has two switch group network terminals, one for front connections and one for rear connections, each of these terminals having likewise both an A appearance and a C appearance at the network 22. Each of the DSA trunks D111–D555 also has one terminal appearance at the A stage 2A of the DSA group switching network 22. In addition to the A and C stages, the network 22 includes a BA stage, a BB stage and a BC stage, the entire network being a nonblocking configuration. Connections to the network 22 are controlled by one of the two markers 21A and 21B, these markers being alternately on-line. An allotter 21AL and a maintenance section 21MS is common to the two switch markers 21A and 21B. The common control group includes three common logic groups 31A, 31B and 31C, each of which receives and processes call information simultaneously. A parity circuit 33 includes comparison apparatus for determining whether all three of the common logic units are in agreement and for causing appropriate operating and maintenance action to be taken if they are not in agreement. Memories 32A and 32B are associated with the three common logic units. Output information is taken only from one of the common logic units at any one time. The common control group also includes a coordinate switching matrix 34 for connecting any one of the register junctors to any one of a plurality of receivers or transceivers RN1–RN. In the DSA group the connections are controlled by markers 1A and 1B, the operation of which is more fully described in the aforementioned J. R. Vande Wege application.

General description of operation for call to operator

Assume now that a call received at a terminal circuit T1 from a subscriber line is to be completed to an operator in a DSA marker. All of the terminal circuits of the switch group are connected in multiple via a multiconductor group 10 to the two switch markers 21A, 21B. Assuming that marker 21A is on line, the call is detected and identified via the CM and PTG conductors. The information is forwarded from the marker via a multiconductor data bus 30 to the common logic units of the common control group. The common control then selects an idle register junctor such as RJ1 and via the data bus conductors 30 supply the terminal information for terminals T1 and the receiving terminal RJ1 to the marker 21A. The marker then selects and establishes an idle path between these two terminals through the five stages of network 22 and releases. The common control group connects the junctor RJ1 via matrix 33 to a local subscriber touch calling receiver such as R1. The subscriber then dials signals which are transmitted via the terminal T1, the switch network 22, and the junctor RJ1 to the receiver R1. The signals include a designation of the priority and an operator class of call. The common logic then selects a DSA trunk such as D111, obtains the service of a marker 21A and via conductors of the data bus 30 supplies the designation of the terminal T1 and one of the terminals of trunk D111 along with the priority and class-of-service information for the call which is stored in the marker 21A. The marker then selects and establishes a connection through the network 22 from terminal T1 to the terminal of trunk D111, and also via conductors of group 10 supplies the priority and class-of-service information to operate relays in the trunk D111. The call is then completed, under control of one of the DSA markers 1A or 1B, via stages 2A, 2B and 2C to a link circuit such as L101 and a position circuit such as P1.

Detailed description of apparatus

Figure 12:
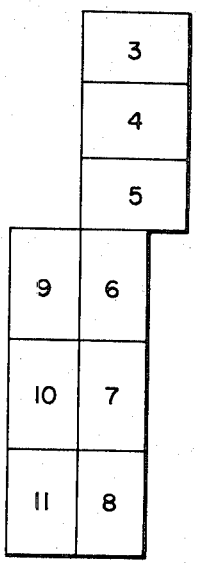
FIG. 12 shows how

FIGS. 3–11 when arranged as shown in FIG. 12 comprise a block and schematic diagram of a part of the system of FIG. 2. FIGS. 3, 4 and 5 show respectively the junctor RJ1, the DSA trunk D111, and the trunk T1. FIGS. 6–11 show a portion of the switch marker 21A.

The apparatus shown in the three circuits of FIGS. 3–5 include the connect relays 3TC, 4TC and 5TC, respectively, with slave connect relays 4TCS and 5TCS in FIGS. 4 and 5, respectively, and various control relays connected to the common bus through the contacts of the connect relay and their slaves. Each of these circuits also includes other apparatus and relays not shown. Some of the control relays have locking paths, not shown, which usually include their own contacts. Some of the conductors of the common bus 10 are used to apply signals to "mark" the circuit during the marker cycle for establishing the connection through the network 22; and others are used to apply signals to "preload" information in the control relays which lock for use after the marker is released.

Figure 6:
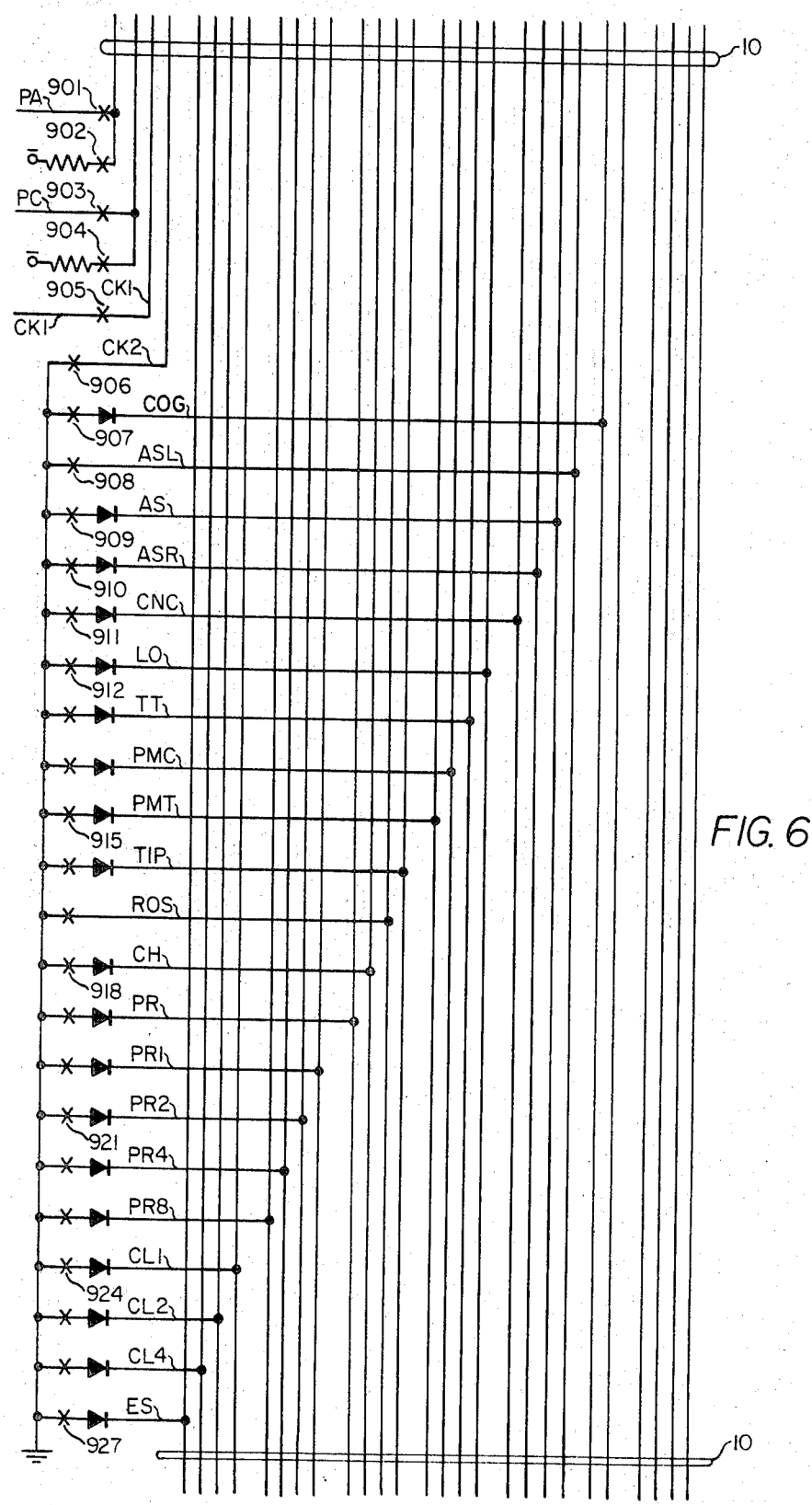
Figure 10:
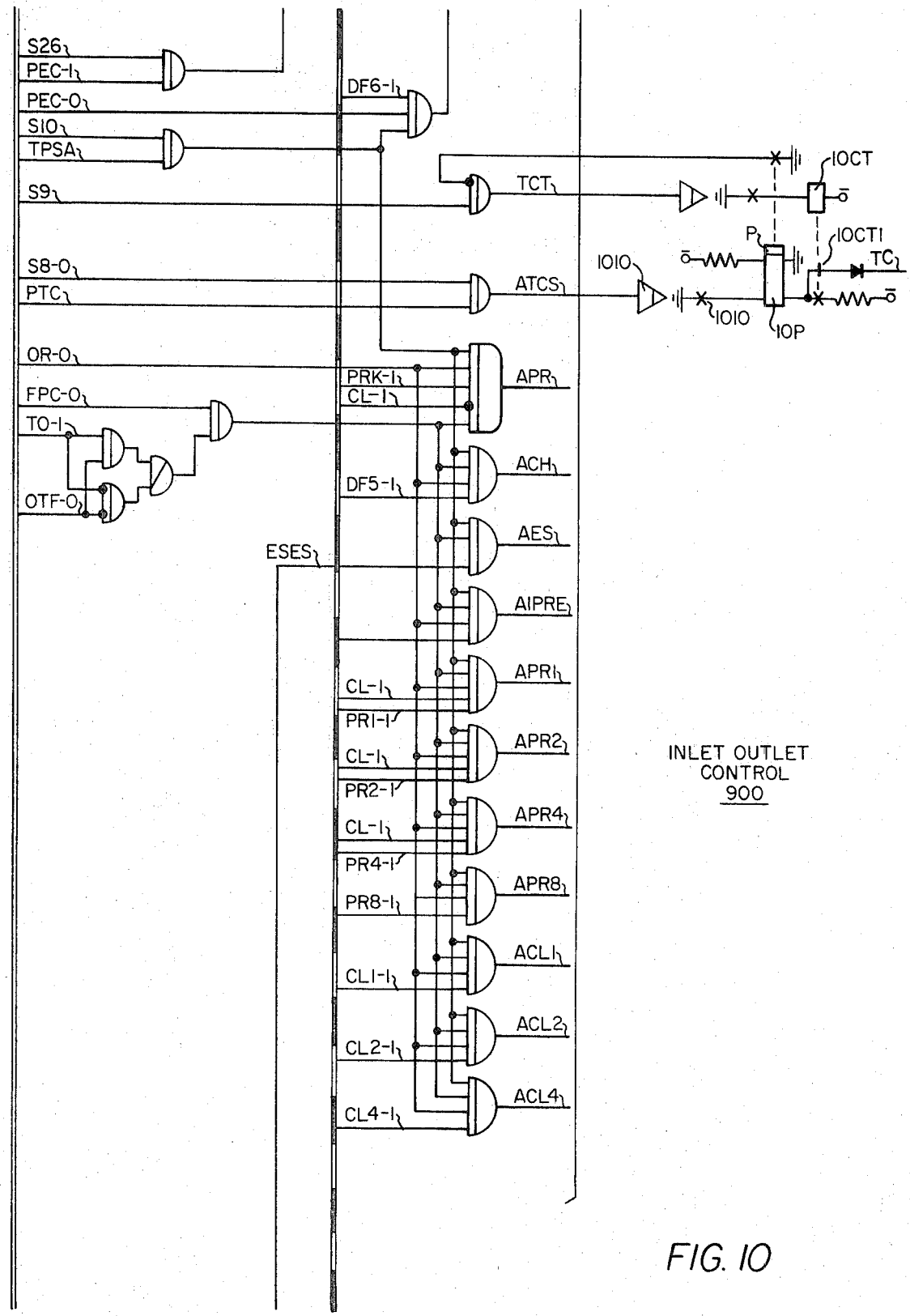

FIGS. 6, 9 and 10 together comprise a diagram of an inlet-outlet control circuit 900 in the marker. The circuit comprises relay drivers 901–927 which supply signals to the conductors on the common bus 10. These relay drivers are shown in FIG. 9, with detached contacts in FIG. 6. The contacts of relay driver 901, 903 and 905 connect the windings of relays 9PA, 9PC and 9CK1, respectively, to the bus conductors PA, PC and CK1; the contacts of relays 902 and 904 connect the bus conductors PA and PC through respective resistors to negative battery potential; and the contacts of relay driver 909–927 connect respective bus conductors to ground potential, there being an isolating diode in series with most of these contacts. The inputs of the relay drivers are connected by logic circuits shown in FIGS. 9 and 10, the inputs of which are supplied from the sequence and supervisory circuits 1110 and the other circuits of FIG. 11.

Figure 7:
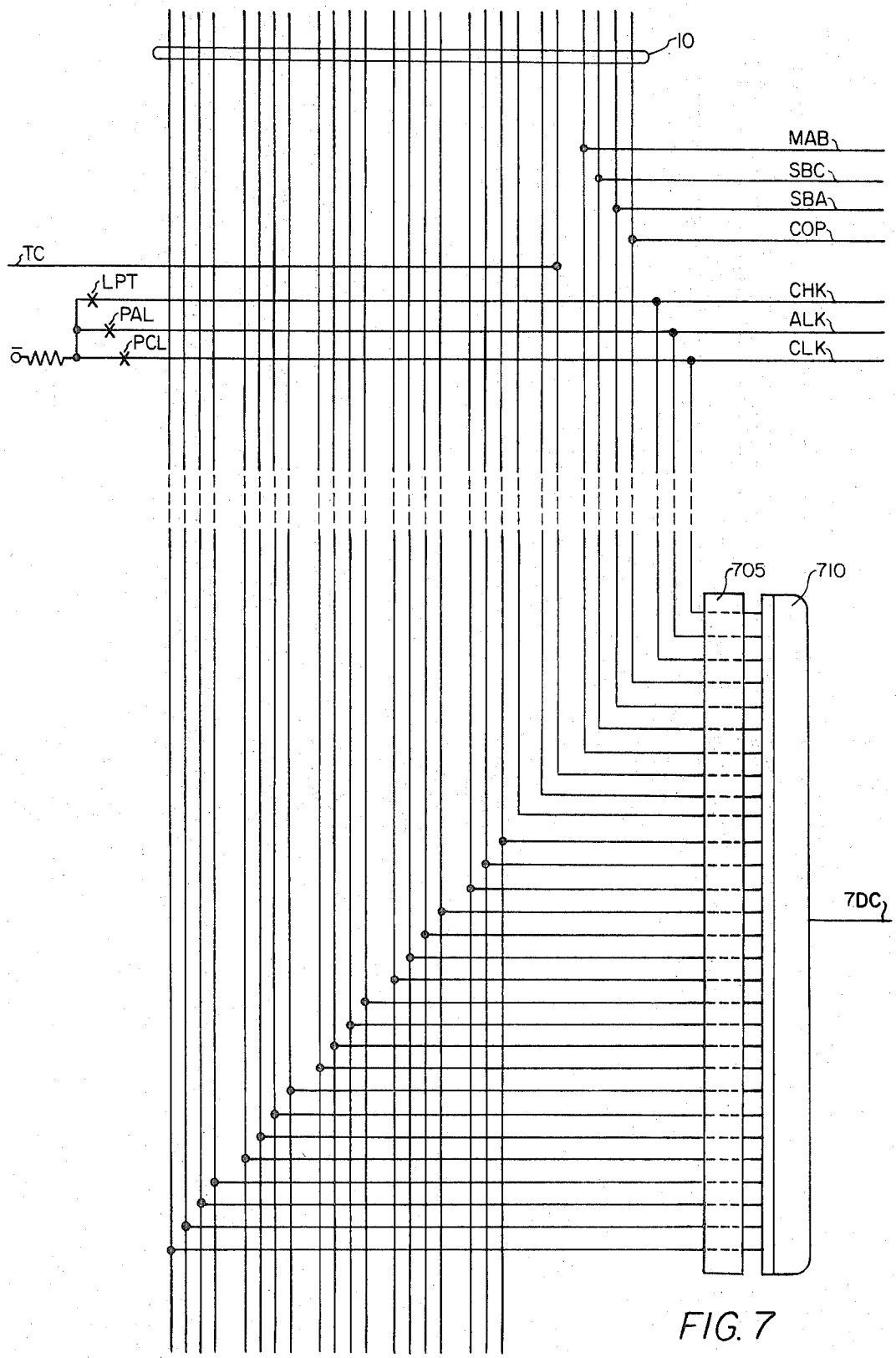

FIG. 7 shows a down-check circuit for testing that all of the bus conductors are in fact open when the connect relays and relay drivers are supposed to be restored.

Figure 8:
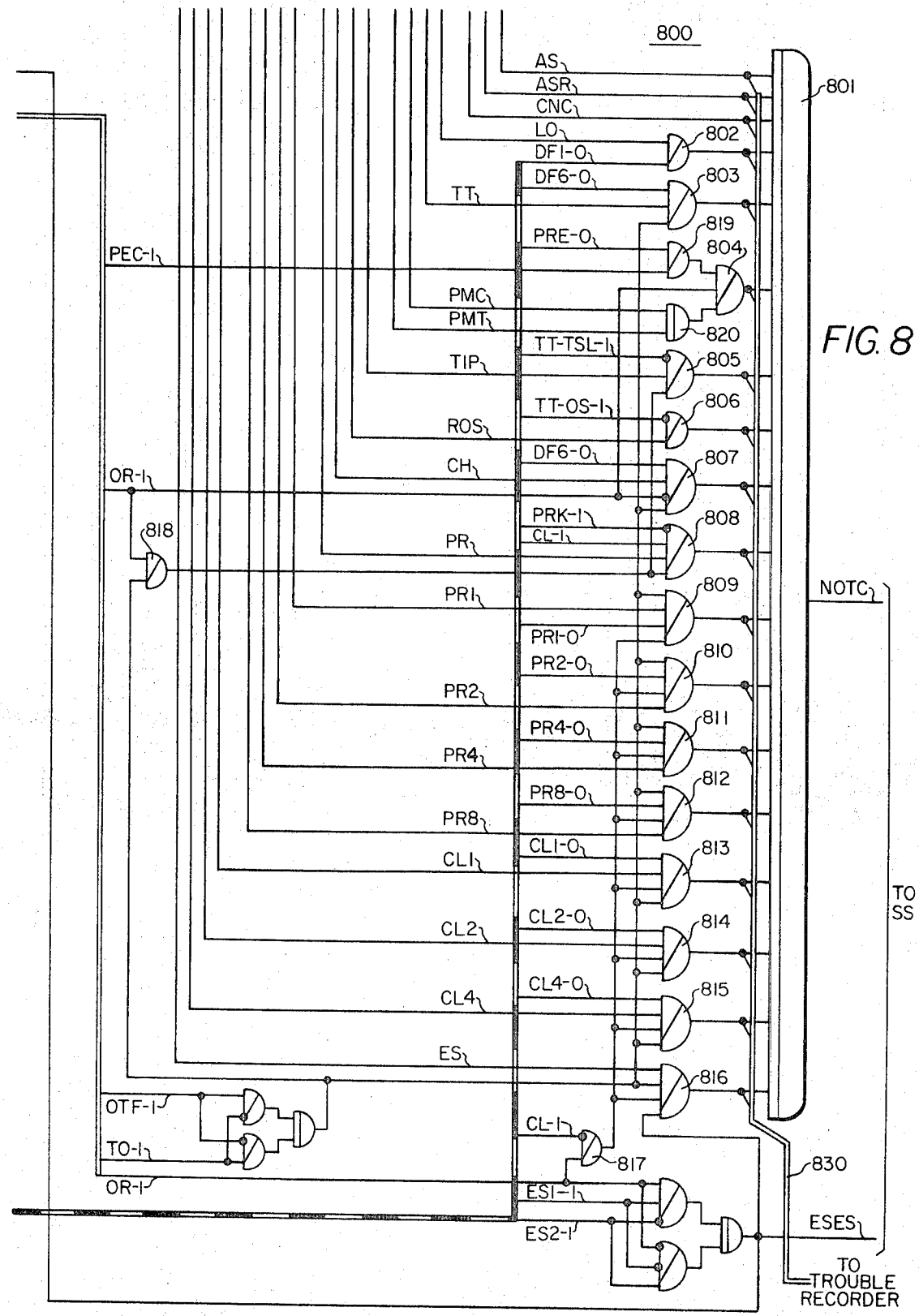

FIG. 8 shows a continuity testing circuit according to the invention, which comprises coincidence AND gate 801 having some of its inputs directly from common bus conductors, and other inputs via detector OR gates 802–816. FIG. 8 also includes other miscellaneous logic circuits.

Figure 11:
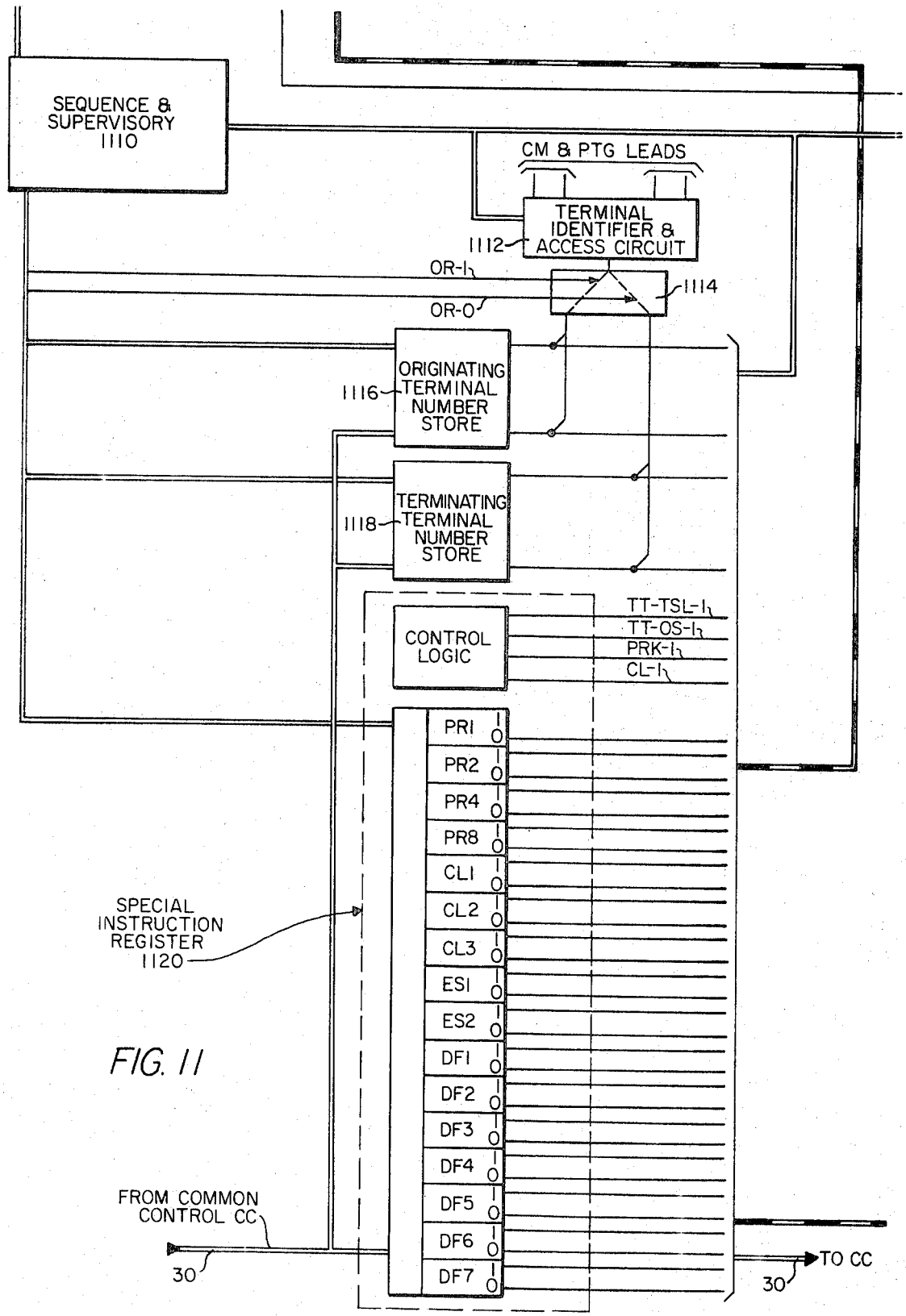

FIG. 11 shows the sequence and supervisory circuits 1110, the terminal identifier and access circuits 1112, and registers connected to the data bus 30 from the common control.

The sequence state and supervisory signals generated by the supervisory circuits 1110 are explained in some detail with reference to a sequence state crart in said Cochran et al. application. The principal sequence states of significance to the present invention are states S7, S8, S9, and S10. During state S7, information is received from the common control circuits on data bus 30 to the registers shown in FIG. 11. There are two passes through the sequence of states S8, S9 and S10, the first time for working with the terminating terminal as determined by the signal OR–0 being true, and the second time for working with the originating terminal as indicated by the signal OR–1 being true. During state S8 the number from one of the stores 1116 or 1118, as determined by the signals OR–1 and OR–0, is gated through gating circuits 1114 to the terminal identifier 1112. When a signal PTC (not shown in FIG. 11) becomes true the terminal identifier and access circuit 1112 supplies a ground signal on one CM lead and a negative battery potential on one PTG lead to operate the connect relay in one of the termination circuits.

During state S9 the slave connect relay is operated if present. At this time the continuity checks according to the invention are made to insure that the necessary bus connections to the termination circuit are complete.

During state S10 some of the signals from the inlet-outlet control circuit 900 are applied to the common bus to perform certain functions in the selected termination circuit. One of these operations which is performed during access of the terminating terminal is to operate the AX relay via ground on lead AS, and to lock it by a ground on lead ASL, following which the connect relay is released. After the second pass through states S8, S9 and S10, the situation will thus be that the terminating circuit has its AX relay operated to connect certain leads to a common bus, and the originating circuit has its TC relay (and slave if present) operated to connect other leads to the common bus. These connections are used for establishing the connection through the switch network, and for certain other operations.

The information received from the common control during state S7, in addition to the numbers placed in the stores 1116 and 1118, include the instructions placed in the special instruction register 1120. Information is stored in the four flip-flops PR1–PR8 and the three relays CL1–CL4 only for calls to an operator via the DSA trunks D111–D555 (FIG. 2). Information coded in the four flip-flops PR1–PR8 indicates the priority of the call, and the information coded in the three flip-flops CL1–CL4 indicates the class of service (information, for example) desired from the operator. Whenever there is any information stored in these flip-flops the control logic of the register 1120 generates a signal CL1 as an OR function of the outputs of the three flip-flops CL1–CL4. The control logic also generates the signal PRK–1 on a call in which a trunk is being preempted, and signals TT–TSL and TT–OS–1 for other purposes. The information which may be stored in flip-flops DF1–DF7 are for special purposes, for example flip-flop DF1 is set to indicate a lockout, and flip-flop DF2 is set to indicate a preempt call.

Referring again to the continuity circuit 800 in FIG. 8, note that the three common bus leads AS, ASR, and CNC are connected directly as input to the AND gate 801, since these leads are connected via contacts of the connect relay on every access of a termination circuit. The other inputs to AND gate 801 are via detector OR gates 802–816, each of which has one input from a common bus conductor. Each of these detector OR gates also has one or more inputs derived from the output of the special instruction register, so that if the common bus lead is not to be used during a particular access of a termination circuit, the corresponding input of the AND gate 801 may be enabled to permit the continuity check to be successful. The common bus conductors associated with gates 809–816 are used only during a call to a DSA trunk, then only during the access of the terminating circuit. On all other calls the signal on lead CL–1 inverted via a gate 817 enables all of these gates, and on calls to a DSA trunk the signal on lead OR–1 via gate 817 enables all of these gates during the access of the originating circuit.

Detailed operation

Assume that marker 21A detects a call-for-service signal and identifies that the call for service was originated by the terminal circuit T1 (FIG. 5). The identity of the terminal circuit is determined and stored in the originating terminal number store 1116. The marker then generates a service-request signal to the common control; and after receiving a responding go-ahead signal, sends the identity of the calling terminal thereto. After determining the availability of a register-sender junctor such as RJ1 the common control seizes the marker and supplies the marker with the identity of the originating and terminating circuits, in this case, originating terminal T1 and a terminating equipment RJ1. The originating terminal number is stored in the originating terminal number store 1116 and the terminating circuit number is stored in the terminating terminal number store 1118. The common control equipment also sends information which is stored in the special instructions register 1120. The marker now can proceed establishing a connection through the switching network between the trunk T1 and the register-sender junctor RJ1.

Piror to the establishment of a communication path through the network, the marker preloads and marks the two terminal circuits which are to be connected. The operations of the marker are controlled by a sequence and supervisory circuit 1110, which generates twenty-eight sequence states or marker operation periods, during which various tasks are accomplished.

The terminating circuit is preloaded first and then the originating circuit is seized. The marker receives the identity of the originating and the terminating terminal circuits plus the instructions pertaining to that particular call in sequence state S7.

The determination of the order of marking the terminating and originating circuit by the marker is controlled by leads OR–1 and OR–0 which are the outputs from a flip-flop (not shown). When the flip-flop is in its reset state the signal on lead OR–0 is true and the signal on lead OR–1 is false indicating a selection of the terminating circuit.

Terminating terminal marking

Upon the marker advancing to sequence state S8 for the first time the signal on lead OR–0 is true, the information stored in the terminating-terminal number store TTNS is sent via a gating circuit 1114 to the terminal identifier and access circuit 1112. The terminal identifier and access circuit 1112 decodes the terminating circuit identity and extends operating potentials via the PTG and CM leads to the connect relay in that circuit. In this case it is the register junctor circuit RJ1 shown in FIG. 3, where connect relay 3TC operates to close a plurality of associated normally open contacts. The marker then advances to its operational sequence state S9.

The operation of relay 3TC, is effective to connect the control equipment associated with leads TT, CNC, ASR, AS, ASL, COG, TC and COP to the common bus 10. The marker first checks whether only one terminal is connected to the bus, by extending a ground via contacts of relay driver 1010, relay 10P, break contacts 10CT1, a diode, lead TC, and contacts 3TC–6 to resistance battery in circuit RJ1. Relay 10P is so arranged that if more than one resistance potential is parallel connected to lead TC the relay 10P will operate and the call will not be processed.

If only one terminal is connected, the marker proceeds to check whether the contacts associated with relay 3TC have been successfully closed, which is indicated by a true signal on lead NOTC from the continuity checking circuit 800. Lead NOTC at the output of AND gate 801 becomes true when all its inputs are true, and an error or false signal is generated when at least one of the AND gate inputs is false. A true signal is generated when a connect relay in the terminal equipment has been energized and its contacts have successfully completed circuits from the negative potentials in the terminal circuit to representative leads of the common bus 10. These negative potentials are extended via the relay windings, contacts of the connect relay and the respective bus leads, to respective inputs of the AND gate 801 either directly or via the OR gates 802–816. The absence of a negative potential on any required bus lead indicates an open circuit which may be caused by an open connect contact or the malfunction of a relay in the terminating equipment.

As described in the section entitled "Detailed Description of Apparatus," the OR gates 802 and 804–816 are enabled by signals derived from the special instruction register 1120.

The checking circuit 800 checks the leads which are associated with the terminating circuit RJ1. A true signal or a no error signal will be generated at the output of gate 801 on lead NOTC provided the negative or true signal is present on the following leads; AS, ASR, CNC and lead TT. The marker advances to state S10 if the output from gate 801 is true, or notifies the common control that the call cannot be processed if the output is false. Assuming advance to state S10, a ground potential is extended via closed contacts of relay driver 908, lead ASL, closed contacts 3TC–5 and the upper winding of relay 3AX to negative potential. Relay 3AX operates and is held. The marker releases the connect relay 3TC and returns to state S8, after which it proceeds to seize the originating terminal circuit T1.

Originating terminal marking

When the marker reenters sequence state S8 from sequence state S10, flip-flop OR (not shown) is set so that the signal on lead OR–1 becomes true and the signal on the lead OR–0 becomes false. Thus the information stored in the originating-terminal number store 1116 is sent via the gating circuit 1114 to the terminal identifier and access circuit 1112. Circuit 1112, decodes the originating circuit equipment number and extends an operating potential to the connect relay in that circuit, which in this case is the trunk circuit T1 shown in FIG. 5. Relay 5TC operates to close a plurality of associated normally open contacts. The marker then advances to its operational sequence state S9.

In sequence state S9 the marker first checks whether only one terminal circuit is connected to the bus, by extending a ground via relay driver contacts 1010, relay 10P, contacts 10CT1, lead TC, contacts 5TC5, and the winding of relay TCS to negative potential. A check for a single trunk connection is performed as described in the terminating terminal circuit continuity check. A ground potential is extended through contacts 1010 to energize relay 5TCS. Relay 5TCS operates, connecting a further plurality of control trunk equipment to the associated trunk bus leads. As described in the operation for the terminating circuit, a continuity check is also performed in the originating mode by circuit 800. Since the signal on lead OR–1 is true in the originating mode, OR gates 804, 805 and 808–816 are enabled, generating a true signal to the inputs of gate 801. Thus, although the trunk T1 has various units of equipment connected to the common bus leads, in its originating mode, only leads AS, ASR, CNC, LO, TT and ROS will be used for controlling, and therefore only those leads will be checked for continuity. If the signal on lead NOTC from the output of gate 801 is true, indicating no open connect contacts on relays 5TC and 5TCS or that there are no faulty indications of the equipment in the trunk T1, the marker advances to sequence state S10 and then proceeds to make the connections between the trunk T1 and register junctor RJ1.

Dial service assistance terminating terminal circuit marking

Each dial service assistance call to a trunk such as trunk D111 includes the priority and class of call information for that particular call. The special instruction register receives this information from the common control equipment and stores the priority by setting one or more of the flip-flops PR1–PR8 and the class of service information is stored by setting one or more flip-flops CL1–CL4. To seize the trunk D111, the operation described earlier for energizing relay 5TC and 5TCS is repeated.

However, it should be noted that for any particular call, only the priority relays and class of service relays that correspond to the set flip-flop in the special instruction register need to be energized, the remaining priority and class of service relays will not affect the call whether they are connected to the common bus leads or not. Therefore, it is necessary to check only for the proper connection of the relays which will be utilized for this call.

With a dial-service-assistance trunk as terminating circuit, the signals on leads CL–0 and OR–1 are false, the output from gate 817 is also false, thus the outputs from gates 809–816 are also false. Assume that in the special instruction register, flip-flop PR1 is set and flip-flops PR2, PR4 and PR8 are not set and flip-flop CL–1 is set while flip-flops CL–2 and CL–4 are not set indicating that the priority relay 5PR1 and class relay 5CL1 in the trunk circuit D111 should be operated. The outputs PR2–0, PR4–0, PR8–0, CL2–0 and CL4–0 from the special instruction register to the inputs of respective gates 811–812, 814 and 815 enable those gates to provide a true signal to the input of gate 801. To store the proper priority and class information in trunk D111, the signals on common bus leads PR1 and CL1 have to be true. Therefore a negative potential must extend from the trunk, through respective relay windings and connect contacts, via leads PR1 and CL1 to respective gates, thus enabling gates 809 and 813 to generate true signals to the input of gate 801.

Down check

The communication path is held independently of the marker upon completion of the connection through the network. The control connections from the inlet-outlet control 900, via common bus leads 10 to the termination circuits are dropped. The marker must now verify the absence of any potential on the common bus leads prior to entering its idle state.

The checking for a proper disconnect operation is performed by the AND gate 710 connected to the common bus leads via inverter circuit 705. Circuit 705 inverts the signal on each lead from the common bus. Open circuits are interpreted as being false. All the false signals through circuit 705 generate true signals on their respective leads to the input of gate 710. All true signals to gate 710 generates a true signal on lead 7DC, which indicates that all equipment is properly disconnected from the common bus leads 10. A false signal on one or more leads to AND gate 710 generates a false signal on lead 7DC indicative of a stuck contact on one or more control leads in the termination circuit.

Recording of fault

Each input lead to AND gate 801 is individually multipled via cable 830 to the trouble recorder (not shown) for localization of the trouble within the particular terminal unit. If, according to the described method a trouble signal is generated on lead NOTC, the marker stops the process of establishing a connection for this particular call, notifies the common control of such trouble and sends the equipment number of that terminal to the trouble recorder. Since the trouble condition occurs if one or more input leads to gate 801 indicate absence of a negative potential either from the terminal equipment or the special instruction register, the input leads to gate 801 which are individually multipled via cable 830 to the trouble recorder supply information of the particular equipment malfunction within the terminal. The localization information and the terminal equipment number are then recorded, for future diagnostic purposes.

Conclusion

From the foregoing it will be apparent that applicant's bus checking circuit requires only a few gating devices which are capable of detecting faults on all or any combinations of the common bus leads and provides means for localizing and isolating such faults. Furthermore the present invention provides a circuit for detecting proper disconnections of control devices from the common bus leads.

What is claimed is:

1. In a communication switching system having a switching network with a plurality of circuit terminations divided into groups of different types, with a marker to selectively establish connections through the network between circuit terminations for calls, each circuit termination having a connect means and at least one control device connected between a source of first potential and its connect means, said marker having access to said circuit terminations via a common bus comprising a plurality of leads for controlling said terminations, selection means to operate the connect means of one circuit termination at a time to connect the control devices to corresponding leads of the common bus, said circuit terminations of said different types requiring different ones of said plurality of leads connected thereto for calls and said marker further having control means for selectively applying control signals to particular common bus leads to thereby control circuit terminations, said control means being responsive to a plurality of outputs from a special instruction register provided in the marker;

continuity testing apparatus effective before operation of said control means to verify the continuity of said common bus leads comprising;

a plurality of detecting gates individual to the common bus leads, each having, a first input connected to the corresponding common bus lead, providing a first condition signal to the input of the respective gate upon there being a complete circuit, via said input, the common bus lead, the connect means and the control device to the source of said first potential, at least another input from the corresponding inverted output of said special instruction register to provide a first condition signal to the input of its respective detector gate, said detector gates each providing an OR-condition signal at its output in response to any one of its input signals being of the first condition; and a coincidence gate means having a plurality of inputs individually connected to respective detector gate outputs, and an output for indicating the result of the continuity test, whereby, for every common bus lead to be used for extending control signals to a particular termination the associated connection from said special instruction register is set to said second condition signal to thereby check said common bus leads for the presence of said first condition at the inputs of said coincidence gate.

2. The combination claimed in claim 1, wherein some of said plurality of detector gates (802–816) have still another input common to said some gates for enabling gates during particular calls, thereby excluding common bus leads associated with said gates from continuity testing.

3. In a communication switching system, the combination as claimed in claim 2, wherein said coincidence gate means, in addition to said inputs from said detector gate outputs, has further inputs from respective common bus leads, whereby common bus leads are coupled to respective inputs of the coincidence gate means, some directly and others via said detector gates.

4. In a communication switching system, the combination as claimed in claim 3 and further including a plurality of test leads connected individually to the input connections of said coincidence gate, said test leads being coupled to a trouble recorder to localize any common bus lead which has no continuity.

5. In a system including a control circuit, a plurality of circuit terminations of different types, a common bus comprising a plurality of leads for extending control signals from said control circuit to said circuit terminations, each circuit termination having a connect means and at least one control device connected between a source of first potential and its connect means, selection means to operate the connect means of one circuit termination at a time to connect the control device to corresponding leads of the common bus, said control circuit having control means for selectively extending a second potential to said control devices via associated bus leads, a special instruction register having a plurality of outputs connected to said control means for controlling said extending second potential;

continuity testing apparatus effective before operation of said control means to verify the continuity of said common bus leads comprising:

a plurality of detecting gates individual to the common bus leads, each having a first input connected to the corresponding common bus lead, providing a first condition signal to the input of the respective gate upon there being a complete circuit, via said input, the common bus lead, the connect means and the control device to the source of said first potential, a second input from the corresponding inverted output of said special instruction register to provide a first condition signal to the input of its respective detector gate, said detector gates each providing an OR-condiion signal at its output in response to any one of its input signals being of the first condition:

a coincidence gate means having a plurality of inputs individually connected to respective detector gate outputs and respective common bus leads, and an output for indicating the result of the continuity test, whereby, for every common bus lead to be used for extending control signals to a particular termination the associated connection from said special instruction register is set to said first condition to thereby inhibit via its inverted output the respective detector gate and check said common bus leads for the presence of said first condition signal at the inputs of said coincidence gate.

6. In a communication switching system, the combination as claimed in claim 5 and further including a plurality of test leads connected individually to the input connections of said coincidence gate, said test leads being coupled to a trouble recorder to localize any common bus lead which has no continuity.

No references cited

KATHLEEN H. CLAFFY, Primary Examiner

D. W. OLMS, Assistant Examiner